United States Patent [19]

Swearingen et al.

[11] Patent Number: 4,647,616

[45] Date of Patent: Mar. 3, 1987

[54] THERMOSETTABLE POLYMER OR PREPOLYMER PREPARED FROM HERTEROCYCLE MATERIAL CONTAINING A NITROGEN ATOM AND CARBOXYLIC ACID MONO- OR DIANHYDRIDE

[75] Inventors: Loren L. Swearingen, Freeport; Jimmy D. Earls; Randy J. LaTulip, both of Lake Jackson, all of Tex.

[73] Assignee: The Dow Chemical Company, Midland, Mich.

[21] Appl. No.: 754,697

[22] Filed: Jul. 15, 1985

[51] Int. Cl.$^4$ .................................... C08G 83/00
[52] U.S. Cl. ............................ 524/600; 524/606; 524/607; 525/432; 528/208; 528/228; 528/229; 528/335; 528/336; 528/341; 528/342; 528/344; 528/351; 528/352; 528/353
[58] Field of Search ............ 528/341, 342, 335, 344, 528/353, 352, 228, 229, 208; 524/600, 606, 607; 525/432

[56] References Cited

U.S. PATENT DOCUMENTS

| | | | |
|---|---|---|---|
| 3,424,718 | 1/1969 | Angelo | 260/47 |
| 3,528,950 | 9/1970 | Lubowitz | 260/78.4 |
| 3,562,223 | 2/1971 | Bargain et al. | 260/78 |
| 3,808,209 | 4/1974 | Donald | 260/250 R |
| 4,362,860 | 12/1982 | Ratto et al. | 528/248 |
| 4,471,107 | 9/1984 | Peake | 528/248 |

FOREIGN PATENT DOCUMENTS 42-14468  8/1967  Japan .

OTHER PUBLICATIONS

*New Commercial Polymers*, 1969–1975, by Hans-Georg Elias, Gordon and Breach, Science Publishers, New York, 1977, pp. 139–140.

"Nuclear Magnetic Resonance Study of Norbornene End-Capped Polyimides. 1. Polymerization of N—Phenylnadimide", by A. C. Wong and W. M. Ritchey, *Macromolecules*, 1981, vol. 14, pp. 825–831.

"Nuclear Magnetic Resonance Study of Norbornene End-Capped Polyimides. 2. Solution and Solid-State Carbon-13 Study of 2 NE/MDA and PMR Polymerization", by A. C. Wong, A. N. Garroway and W. M. Ritchey, *macromulecules*, 1981, vol. 14, pp. 832–836.

Manly et al in "A Study of the Chemistry of Pyrophthalone and Related Compounds", in *J. Org. Chem.*, 1958, vol. 23, pp. 373–380.

J. Ploquin et al in "Heterocyclic β-Diketoenamines:1. 1,3-Indanediones Substituted at Position 2 With a Nitrogen Heterocycle", *J. Heterocyclic Chem.*, 1980, vol. 17, pp. (1–32).

J. Ploquin et al in "Pyrophthalones II. Synthesis and Pharmacodynamic Activity of γ-Pyrophthalones. Effect of Substituents on the Pyridine Ring", *Eur. J. Med. Chem.*, 1974, vol. 9, pp. 519–525 (1–28).

J. Ploquin et al in "Reactivity of Methyl Groups During Condensation of 2,4-Lutidine and 2,4,6-Collidine With Phthalic Anhydride", *C. R. Acad. Sc. Paris*, Dec. 23, 1974, vol. 279, pp. 1149–1152 (1–7).

*Primary Examiner*—Harold D. Anderson
*Attorney, Agent, or Firm*—James G. Carter

[57] ABSTRACT

Thermosettable prepolymers are prepared by reacting (A) a heterocyclic material containing one or more rings and one nitrogen atom or a mixture of such materials wherein at least one of such materials contains at least two reactive substituent groups having at least one reactive hydrogen atom attached to a carbon atom which is attached to the ring such as 2,4,6-trimethyl pyridine; with (B) a cycloaliphatic or aromatic carboxylic acid mono- or dianhydride such as phthalic anhydride. These prepolymers or resins, can be homopolymerized without coreactants or copolymerized with N,N'-bis-imide such as 1,1'-(methylenedi-4,1-phenylene)bismaleimide, to produce products, mat castings or composites having good mechanical and thermal properties.

33 Claims, No Drawings

4,647,616

THERMOSETTABLE POLYMER OR PREPOLYMER PREPARED FROM HERTEROCYCLE MATERIAL CONTAINING A NITROGEN ATOM AND CARBOXYLIC ACID MONO- OR DIANHYDRIDE

BACKGROUND OF THE INVENTION

The present invention concerns polymers prepared by reacting a heterocyclic material having one or more rings and 1 nitrogen atom therein or mixtures thereof wherein at least one of such material contains at least 2 reactive substituent groups which have at least one hydrogen atom attached to a carbon atom which is attached to the heterocyclic ring with cycloaliphatic or aromatic carboxylic acid mono or dianhydrides.

It has been shown by Manly et al in *J. Org. Chem.*, 1958, Vol. 23, pp. 373–380 that indanediones can be prepared by reacting dimethylpyridines with phthalic anhydride. He also stated that 2-methylpyridine reacted with phthalic anhydride to form pyrophthalone.

Ogata in Japanese Pat. No. Sho 42(1967)-14468 prepared polymers that melt above 500° C. by reacting pyridine having methyl substituents with pyromellitic dianhydride.

The present invention provides polymers by the reaction of nitrogen containing heterocycles having at least two reactive substituent groups which have at least one hydrogen atom attached to a carbon atom which is attached to the nitrogen-containing heterocyclic ring and one nitrogen atom with carboxylic acid mono or dianhydrides. Polymers with melting points less than 300° C. can be obtained by the reaction of an aromatic heterocyclic material containing one nitrogen atom having such reactive substituent groups with dicarboxylic acid monoanhydrides, or by the reaction of the aromatic nitrogen containing heterocycle having such reactive substituent groups with a tetracarboxylic acid dianhydride or by addition of an aromatic nitrogen containing heterocycle having one such reactive substituent group or a dicarboxylic acid monoanhydride as chain terminators, or no catalyst, or limiting the reaction time, or an excess of one of the reactants. These prepolymers can be homopolymerized or copolymerized with a N,N'-bis-imide to give thermoset products with good thermal properties as well as good physical properties.

The resin or resin mixture softens below 300° C., preferably below 200° C., which provides for ease of processing the prepolymers as homopolymeric materials or as copolymers with N,N'-bis-imides. For a resin to obtain its greatest utility it must be moldable. Molding of resins is convenientably done at or about 200° C. or below. The resins produced from a nitrogen containing heterocycle with at least two reactive substituent groups and a tetracarboxylic acid dianhydride must have softening points at or about 200° C. or below in order to find their greatest use in forming composites of the homopolymer by solution or hot melt prepregging, in blending with N,N'-bis-imides to form copolymers, or in forming composites from the N,N'-bis-imide copolymers. The prepolymers discussed in this patent and the copolymers made by addition of N,N'-bis-imides all have softening points at or about 200° C. or below.

SUMMARY OF THE INVENTION

The present invention pertains to a polymer or prepolymer prepared by reacting (A) a heterocyclic material containing one or more rings and one nitrogen atom in the ring structure or mixture of any two or more of such materials having at least one substituent group having at least one reactive hydrogen atom attached to a carbon atom which is attached to the heterocyclic ring with the proviso that at least one of such materials has at least two substituent groups having at least one reactive hydrogen atom attached to a carbon atom which is attached to a ring; with (B) at least one cycloaliphatic or aromatic carboxylic acid mono- or dianhydride; wherein the reactants are employed in quantities which provide a mole ratio of (A) to (B) of from about 0.25:1 to about 4:1, preferably from about 0.8:1 to about 1.5:1.

Another aspect of the present invention pertains to a polymer or prepolymer prepared by reacting (A) a heterocyclic material containing one or more rings and one nitrogen atom in the ring structure or mixture of any two or more of such materials having at least one reactive substituent group having at least one reactive hydrogen atom attached to a carbon atom which is attached to the heterocyclic ring with the proviso that at least one of such materials has at least two substituent groups having at least one reactive hydrogen atom attached to a carbon atom which is attached to the heterocyclic ring; (B) at least one tetracarboxylic acid dianhydride; and (C) at least one dicarboxylic acid monoanhydride wherein the reactants are employed in quantities which provide a mole ratio of (A) to (B) to (C) of from about 0.25:1:0.1 to about 4:1:4, preferably from about 0.8:1:0.5 to about 3:1:2.

A further aspect of the present invention pertains to the products resulting from curing the aforementioned prepolymers by subjecting them to heat and pressure and/or copolymerization with a N,N'-bis-imide.

In order for the hydrogen atom of the substituent group which hydrogen atom is attached to a carbon atom attached to a ring to be reactive, the substituent group must be either ortho or para with respect to a nitrogen atom.

DETAILED DESCRIPTION OF THE INVENTION

Any pyridine material which has at least two methyl, —CH($R^2$)$_2$ or —CH$_2$$R^2$ groups wherein each $R^2$ is independently a hydrocarbyl group containing from 1 to about 20, preferably from 1 to about 10 carbon atoms attached to the ring on positions either ortho or para to the ring nitrogen can be employed herein.

The term hydrocarbyl as employed herein means any aliphatic, cycloaliphatic, aromatic, aryl substituted aliphatic or aliphatic substituted aromatic groups.

Particularly suitable as the heterocyclic material which can be employed herein include the pyridines such as, for example, 2,4-dimethylpyridine, 2,6-dimethylpyridine, 2,4,6-trimethylpyridine, 2,3,4,6-tetramethylpyridine, 4-ethyl-2,6-dimethylpyridine, 2-ethyl-4,6-dimethylpyridine, 2,6-dimethyl-4-propylpyridine, 2,5-diethyl-4,6-dimethylpyridine, 2,6-dimethyl-4-(1-methylethyl)pyridine, 4-butyl-2,6-dimethylpyridine, 2-butyl-3,4,6-trimethylpyridine, 2,6-dimethyl4-(2-methylpropyl)pyridine, 2,4,6-triethylpyridine, 2,6-dimethyl-4-phenylpyridine, 2,3,6-trimethyl-4-(2-methylpropyl)pyridine, 2,6-dimethyl-3,4-pyridinediamine, 2,4,5-trimethyl-6-nitropyridine, 2-chloro-4,6-dimethylpyridine, mixtures thereof and the like. 2-Methylpyridine or 4-methylpyridine can be mixed or blended with pyridine having two or more reactive substituent groups to control the molecular weight of the prepolymer.

Other suitable aromatic nitrogen containing heterocycles which can be employed herein include, quinolines and isoquinolines having two or more reactive substituent groups having at least one reactive hydrogen atom attached to a carbon atom which is attached to the heterocyclic ring. Such substituent groups include methyl, —CH($R^2$)$_2$ or —CH$_2$$R^2$ wherein $R^2$ is as above defined.

Suitable quinolines include 2,4-dimethylquinoline, 2,4-diethylquinoline, 2,4-dibenzylquinoline, 2-ethyl-4-benzylquinoline, 2-ethyl-4-methylquinoline, mixtures thereof and the like.

Suitable isoquinolines include 1,3-dimethylisoquinoline, 1,3-diethylisoquinoline, 1-ethyl-3-methylisoquinoline, 1,3-dibenzylisoquinoline, 1-methyl-3-benzylisoquinoline, mixtures thereof and the like.

Molecular weight control of the prepolymer can be obtained by the addition of an aromatic nitrogen containing heterocycle having one reactive substituent group which has at least one reactive hydrogen atom attached to a carbon atom which is attached to the ring to act as a chain terminator in a mixture that contains an aromatic nitrogen containing heterocycle having two or more reactive substituent groups which have at least one reactive hydrogen atom attached to a carbon atom which is attached to the ring. As an example, pyridines, quinolines or isoquinolines having one reactive substituent group which has at least one hydrogen atom attached to a carbon atom which is attached to the heterocyclic ring can be mixed with an aromatic heterocycle containing one nitrogen having two or more reactive substituent groups which have at least one reactive hydrogen atom attached to a carbon atom which is attached to the ring.

Suitable dicarboxylic acid monoanhydrides which can be employed herein include, for example, those represented by the formula

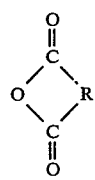

wherein R is a divalent radical such as, for example,

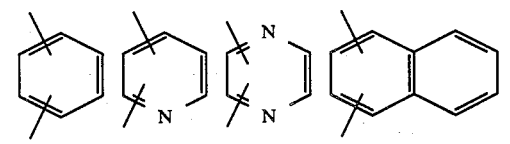

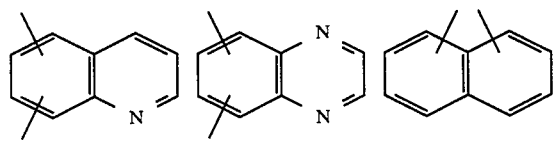

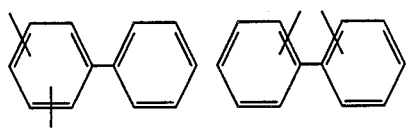

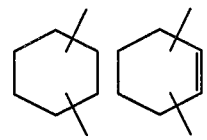

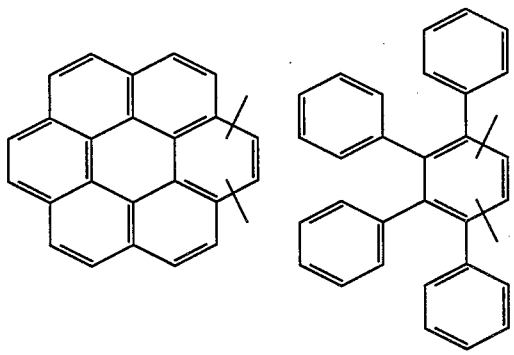

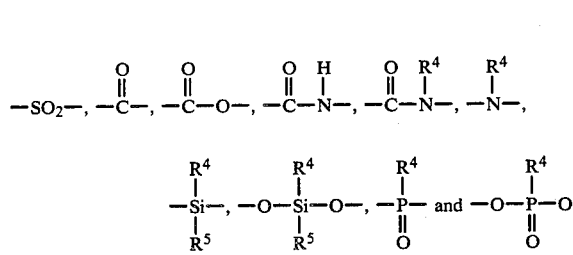

wherein $R^1$ is alkyl, or one of the following:

$$-\underset{H}{N}-, -\underset{CH_3}{N}-, \text{ and } -\underset{R^2}{N}-$$

wherein $R^2$ is alkyl, aryl or aralkyl, or such groups containing substituents such as, for example, halogen, nitro or amino and where $R^3$ is alkylene, oxygen, sulfur, oxyalkylene, polyoxyalkylene, or one of the following:

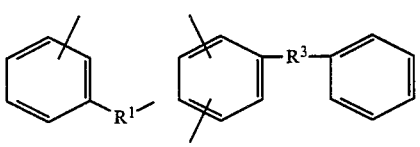

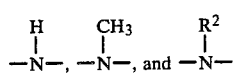

wherein $R^4$ and $R^5$ are alkyl, aryl or such groups containing substituents such as, for example, halogen, nitro or amino.

The preferred monoanhydrides are those in which the carbon atoms of the pair of carbonyl groups are directly attached to ortho carbon atoms in the R group to provide a 5-member ring such as, for example,

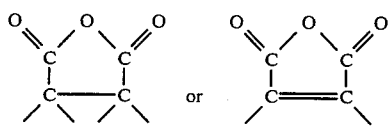 or

Suitable such monoanhydrides include, for example, phthalic anhydride, 3-nitrophthalic anhydride, tetraphenylphthalic anhydride, tetrachlorophthalic anhydride, tetrabromophthalic anhydride, hexahydro-4-methylphthalic anhydride, pyrazine-2,3-dicarboxylic anhydride, pyridine-2,3-dicarboxylic anhydride, quinoxaline-2,3-dicarboxylic anhydride, 2-phenylglutaric anhydride, isatoic anhydride, N-methyl isatoic anhydride, 5-chloroisatoic anhydride, 5-nitroisatoic anhydride, diphenic anhydride, 1,8-naphthalic anhydride, 4-chloro-1,8-naphthalic anhydride, 3-nitro-1,8-naphthalic anhydride, 3,4-cornoenediacarboxylic anhydride, trans-1,2-cyclohexaneanhydride, 3,3-tetramethylneglutaric anhydride, d,1-camphoric anhydride, mixtures thereof and the like.

Suitable tetracarboxylic acid dianhydrides which can be employed herein include, for example, those represented by the formula

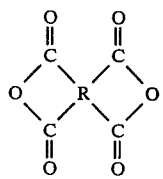

wherein R is a tetravalent aromatic radical such as, for example:

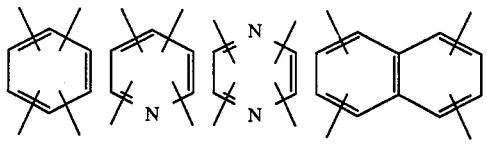

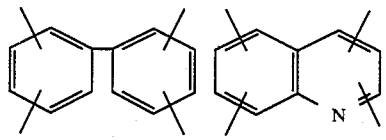

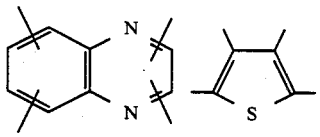

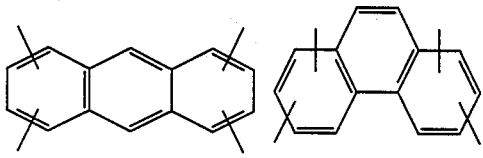

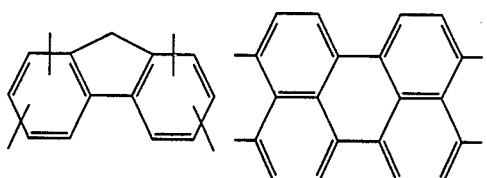

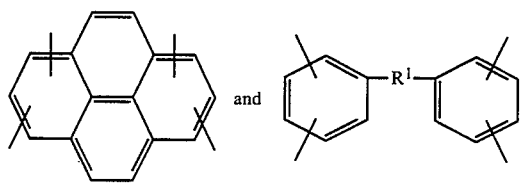 and where $R^1$ is alkylene, oxygen, sulfur, oxyalkylene, polyoxyalkylene, or one of the following:

$$-SO_2-, -\overset{O}{\underset{\|}{C}}-, -\overset{O}{\underset{\|}{C}}-O-, -\overset{O}{\underset{\|}{C}}-\overset{H}{\underset{|}{N}}-, -\overset{O}{\underset{\|}{C}}-\overset{R^2}{\underset{|}{N}}-, -\overset{R^2}{\underset{|}{N}}-,$$

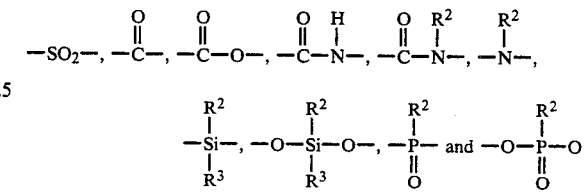

wherein $R^2$ and $R^3$ are alkyl, aryl or aralkyl, or such groups containing substituents such as, for example, halogen, nitro or amino.

Suitable such dianhydrides include, for example, pyromellitic dianhydride, benzene-1,2,3,4-tetracarboxylic dianhydride, pyridine-2,3,5,6-tetracarboxylic dianhydride, pyrazine-2,3,5,6-tetracarboxylic dianhydride, napthalene-2,3,6,7-tetracarboxylic dianhydride, naphthalene-1,4,5,8-tetracarboxylic dianhydride, naphthalene-1,2,4,5-tetracarboxylic dianhydride, 2,6-dichloronapthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, 3,4,9,10-perylenetetracarboxylic dianhydride, thiophene-2,3,4,5-tetracarboxylic dianhydride, bis(3,4-dicarboxyphenyl)sulfone dianhydride, 2,3,2',3'-benzophenonetetracarboxylic dianhydride, 2,3,3',4'-benzophenonetetracarboxylic dianhydride, bis(2,3-dicarboxyphenyl)methane dianhydride, bis(3,4-dicarboxyphenyl)methane dianhydride, 1,1-bis(3,4-dicarboxyphenyl)ethane dianhydride, 2,2-bis(2,3-dicarboxyphenyl)propane dianhydride, bis(3,4-dicarboxyphenyl)ether dianhydride, anthracene-2,3,6,7-tetracarboxylic dianhydride, fluorene-2,3,6,7-tetracarboxylic dianhydride, pyrene-1,2,7,8-tetracarboxylic dianhydride, quinoxaline-2,3,6,7-tetracarboxylic dianhydride, phenazine-2,3,7,8-tetracarboxylic dianhydride, 1,1-bis(2,3-dicarboxy-5-oxyphenyl)ethane dianhydride, mixtures thereof and the like.

Tetracarboxylic acid dianhydrides can be mixed or blended with cycloaliphatic or aromatic monoanhydrides or mixtures of monoanhydrides as chain terminators to control molecular weight of the polymers.

If desired, the reaction can be conducted in the presence of a suitable solvent, such as ketones, ethers, amides, acids, aromatic nitrogen-containing heterocycles containing no reactive substituent groups (i.e. they do not have at least one hydrogen atom attached to a carbon atom which is attached to the heterocyclic ring), chlorinated solvents and the like. Particularly suitable solvents include, tetrahydrofuran, pyridine, acetic acid, N-methylpyrrolidone, N,N-dimethylacetamide, N,N-dimethylformamide, N,N-dimethylmethoxyacetamide, hexamethylphosphotriamide, mixtures thereof and the like.

The reaction temperature may vary depending upon the particular reactants employed. However, any temperature that allows completion of the reaction within a particularly desired time period is suitable. Usually, temperatures of from about 100° C. to about 250° C. are used although lower and higher temperatures can be employed.

If desired, the reaction can also be conducted in the presence of a catalyst such as, for example, acids, Lewis acids, bases or salts. Particularly suitable acids include, for example, sulfuric, hydrochloric, glacial acetic or p-toluene-sulfonic acid. Particularly suitable Lewis acids include boron trifluoride, aluminum trichloride and zinc chloride. Particularly suitable bases include, for example, hydroxides of alkali or alkaline earth metals or of quaternary ammonium. The use of such catalysts is not indispensable but it reduces the time required for the reaction. The amount is e.g. of from about 0.1 to about 10 mole % with respect to the cycloaliphatic or aromatic carboxylic acid mono or dianhydride. If desirable, larger or lesser quantities can be employed.

The reaction can also be accelerated by certain substances such as methyl iodide, methyl sulfate, benzyl chloride etc., capable of forming with the pyridinic base quaternary ammonium derivatives, such substances being usable in catalytic amounts or higher proportions.

Addition of a dehydrating agent such as acetic anhydride, trifluoroacetic anhydride, trichloroacetic anhydride, propionic anhydride and the like can promote the reactions and its action can be sufficient to render superfluous the incorporation of a catalyst. The preferred dehydrating medium is a mixture of glacial acetic acid and acetic anhydride. The acetic acid and acetic anhydride can be removed by distillation, solvent extraction or solvent fractionation.

The reaction is usually conducted either under reduced pressure or in an inert atmosphere such as, for example, nitrogen, helium, neon, zenon, argon, mixtures thereof and the like.

Volatile emission during cure can be limited by subjecting the thermosettable prepolymers or resins of the present invention to sublimation, distillation or solvent extraction to remove reactants, catalyst and solvents. Suitable solvents for extraction include, for example, alcohols, ketones, acetonitrile, ethers, hydrocarbons, esters, chlorinated solvents and the like. Particularly suitable solvents include acetonitrile, methanol, ethanol, acetone, mixtures thereof and the like.

The thermosettable prepolymers or resins of the present invention can be cured as is with the application of heat and pressure, or they can be dissolved in a suitable solvent or mixture of solvents and employed to saturate various reinforcing materials so as to prepare composites therefrom through the application of heat and pressure.

Suitable solvents which can be employed to saturate the various reinforcing materials include, for example, ketones, acetates, alcohols, ethers, hydrocarbons and the like. Particularly suitable solvents include, for example, acetone, methylethylketone, ethyl acetate, methylene chloride, trichloroethylene, tetrahydrofuran, chlorobenzene, ethanol, n-propanol, N-methylpyrrolidone, dimethylformamide, dimethylacetamide, nitrobenzene, mixtures thereof and the like.

Suitable reinforcing materials include, for example, glass fibers, polyamide fiber, carbon or graphite fibers and the like in any form such as, for example, matt, woven or fibrous form. Any synthetic or natural fiber material can be employed as the reinforcing material.

The thermosettable prepolymers can be used according to various conventional techniques applicable to thermosetting resins. Powdered prepolymers are especially adapted for shaping by pressure-molding, but they can also be dissolved in a solvent or be employed in molten form. They can be used in the preparation of laminates or composites, films, coatings and the like.

The prepolymer is advantageously set by a thermal treatment at a temperature of from about 100° to about 300° C. If desired, the polymer can be compression molded at pressures up to about 100,000 psig (689 MPa). Said polymer has a good thermal stability.

The prepolymer can be copolymerized with a N,N'-bis-imide of the formula:

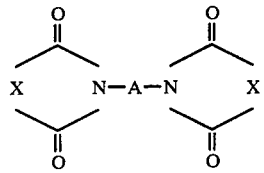

in which X represents a divalent radical containing a carbon-carbon double bond and A is a divalent radical having at least 2 carbon atoms. Preferred N,N'-bisimides which may be employed, include, for example 1,1'-(1,2-ethanediyl)bis-1H-pyrrole-2,5-dione; 1,1,'-(1,6-hexanediyl)bis-1H-pyrrole-2,5-dione; 1,1'-(1,4-phenylene)bis-1H-pyrrole-2,5-dione; 1,1'-(1,3-phenylene)bis-1H-pyrrole-2,5-dione; 1,1'-(methylenedi-4,1-phenylene)bis-1H-pyrrole-2,5-dione (1,1'-(methylenedi-4,1-phenylene)bismaleimide); 1,1'-(oxydi-4,1-phenylene)bis-1H-pyrrole-2,5-dione; 1,1'-(sulfonyldi-4,1-phenylene)bis-1H-pyrrole-2,5-dione; 1,1'-(methylenedi-4,1-cyclohexanediyl)bis-1H-pyrrole-2,5-dione; 1,1'-[1,4-phenylenebis(methylene)]bis-1H-pyrrole-2,5-dione; 1,1'-[(1,1-dimethyl-3-methylene-1,3-propanediyl)di-4,1-phenylene]bis-1H-pyrrole-2,5-dione; 1,1'-[(1,3,3-trimethyl-1-propene-1,3-diyl)di-4,1-phenylene]bis-1H-pyrrole-2,5-dione; and Technochemie's H-795 resin. Technochemie's H-795 resin is represented by the generalized formula:

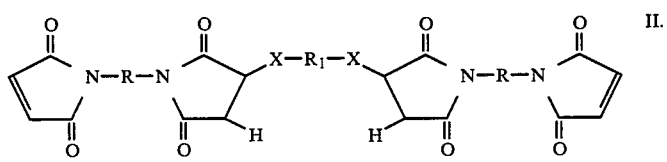

where R is an aromatic ring and $X-R_1-X$ is a Michael addition coupling group. Technochemie's M-751 resin is a "eutectic" mixture of

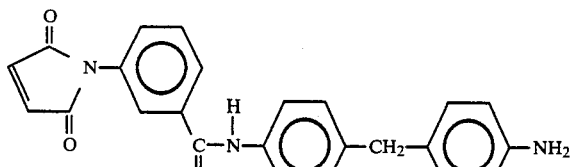

and

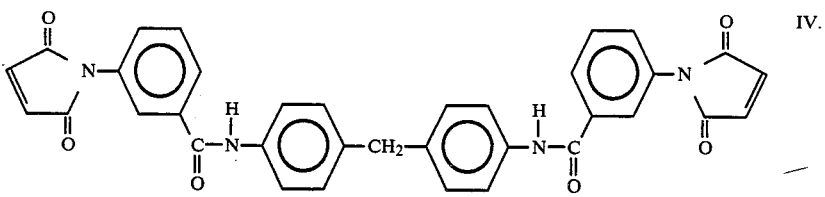

Many of these and other suitable N,N'-bis-imides which can be employed herein are disclosed in U.S. Pat. No. 3,562,223 which is incorporated herein by reference.

The following examples are illustrative of the invention, but are not to be construed as to limiting the scope thereof in any manner.

PREPARATION I

Preparation of a Polyindanylpyridine Prepolymer

A solution of 200 g (1.65 moles) of 2,4,6-trimethylpyridine, 4 ml of concentrated $H_2SO_4$, and 148 g (1.0 mole) of phthalic anhydride was placed in a 500 ml resin kettle equipped with a mechanical stirrer, $N_2$ purge, thermometer, and a reflux condenser. The kettle was heated to reflux (170°–180° C.) by using IR lamps. The solution was stirred well for the 8 hours of reflux and then allowed to cool for 12 hours (43,200 s) without stirring. The material left in the flask is a solid at room temperature. The volatiles (low molecular weight products and starting materials) can be removed from the crude product directly by placing it in a vacuum oven or by washing the sample with relatively low polarity solvents (e.g. $CH_2Cl_2$, acetone) or a mixture of these solvents. The prepolymer recovered has a mp 155°–185° C. The melting point and molecular weight of the prepolymer can be adjusted by the amount of time the reaction is run initially or the length of time the material is B-staged.

PREPARATION II

Preparation of a Polyindacenylpyridine Prepolymer

A solution of 182 g (1.5 moles) of 2,4,6-trimethylpyridine, 4 ml of concentrated $H_2SO_4$, and 218 g (1.0 mole) of pyromellitic dianhydride, and 150 ml of DMF was placed in a 500 ml resin kettle equipped with a mechanical stirrer, $N_2$ purge, thermometer, and a reflux condenser. The kettle was heated to reflux (170°–180° C.) by using IR lamps. The solution was stirred well for the 8 hours (28,800 s) of reflux and then allowed to cool for 12 hours (43,200 s) without stirring. The material left in the flask is a solid at room temperature. The low molecular weight products and starting materials were removed from the crude product directly by placing it in a vacuum oven at 180° C. for 3 to 5 hours. The melting point and molecular weight of the prepolymer can be adjusted by the amount of time the reaction is run initially or the length of time the material is heated under vacuum. A melting point of approximately 180° C. is most desirable and is achieved with about 4 hours (14,400 s) of heating under vacuum.

PREPARATION III

Preparation of Polyindanylpyridine and Bismaleimide Copolymer

A blend of 20 g of polyindanylpyridine prepolymer and 20 g of Compimide 795* were mixed thoroughly and put into a glass dish. The dish was then placed into a vacuum oven that had been preheated to 160° C. The mixture was heated under a full vacuum until the mixture was tacky (~2 hours, 7200 s). The material was cooled to room temperature and ground into a fine powder. This copolymer can then be formed into a casting or molded product at a temperature of approximately 177° C. by conventional processes.
*A proprietary bismaleimide produced by Boots-Technochemie.

PREPARATION IV

Preparation of Prepreg on Nextel* Woven Fabric Using Polyindacenylpyridine

Fifteen grams of the polyindacenylpyridine and 4 g of DMF were added together to give a solution that is 80 weight percent solids. The solution was then heated to 100° C. where the solution's viscosity was low enough to be brushed onto the woven fabric mat. The mat was allowed to dry for 1 hour (3600 s) and then the resin containing solution was added to the reverse side. After air drying the mat was dry to the touch but was still flexible. This prepreg can be fabricated with known art into a composite.
*Nextel is a proprietary high temperature glass fabric produced by 3M.

PREPARATION V

Preparation of Prepreg on Nextel Woven Fabric Using Polyindanylpyridine

Ten grams of the polyindanylpyridine and 5 g of DMF were added together to give a solution that is 66 weight percent solids. The solution was then heated to 100° C. where the solution's viscosity was low enough to be brushed onto the woven fabric mat. The mat was allowed to dry for 1 hour (3600 s) and then the resin containing solution was added to the reverse side. After air drying the mat was dry to the touch but was still flexible. This prepreg can be fabricated with known art into a composite.

PREPARATION VI

Preparation of Polyindacenylpyridine and Bismaleimide Copolymer

A blend of 20 g of polyindacenylpyridine prepolymer and 20 g of Compimide 795* were mixed thoroughly and put into a glass dish. The dish was then placed into a vacuum oven that had been preheated to 160° C. The mixture was heated under a full vacuum until the mixture was tacky (1-2 hours, 3600-7200 s). The material was cooled to room temperature and ground into a fine powder. This copolymer can then be formed into a casting or molded product at a temperature of approximately 177° C. by conventional processes.

*A proprietary bismaleimide produced by Boots-Technochemie.

PREPARATION VII

Preparation of Prepreg on Nextel Woven Fabric Using a Copolymer of Polyindanylpyridine and Bismaleimide Fifteen grams of the polyindanylpyridine/bismaleimide copolymer and 4 g of DMF were added together to give a solution that is 80 weight percent solids. The solution was then heated to 100° C. where the solution's viscosity was low enough to be brushed onto the woven fabric mat. The mat was allowed to dry for 1 hour (3600 s) and then the resin containing solution was added to the reverse side. After air drying the mat was dry to the touch but was still flexible. This prepreg can then be fabricated with known art into a composite.

PREPARATION VIII

Preparation of Prepreg on Nextel Woven Fabric Using a Copolymer of Polyindacenylpyridine and Bismaleimide Fifteen grams of the polyindacenylpyridine/bismaleimide copolymer and 4 g of DMF were added together to give a solution that is 80 weight percent solids. The solution was then heated to 100° C. where the solution's viscosity was low enough to be brushed onto the woven fabric mat. The mat was allowed to dry for 1 hour (3600 s) and then the resin containing solution was added to the reverse side. After air drying the mat was dry to the touch but was still flexible. This prepreg can then be fabricated with known art into a composite.

EXAMPLE 1

Example of Polyindanylpyridine as a Neat Resin Molding

The polyindanylpyridine made in Preparation I was molded at 210° C. under 4000 psi for 3 hours (10,800 s) and then 4 hours (14,400 s) at 215° C. Finally, the temperature was raised to 220° C. for 6 hours (21,600 s). The cured material had a char yield in $N_2$ of 64% at 950° C., which is indicative of high thermal stability.

EXAMPLE 2

Example of Polyindacenylpyridine as a Composite

The prepreg mat formed in Preparation IV was B-staged in a vacuum oven at 175° C. under full vacuum for 45 minutes (2700 s) to remove the solvent. The B-staged material was then pressed at 225° C. for 27 hours (97,200 s) under 500 psi (3447 kPa) pressure to give a composite with resin content of 50 weight percent loading. This composite had a Tg of 230° C.

EXAMPLE 3

Example of Polyindanylpyridine as a Composite

The prepreg mat formed in Preparation V was B-staged in a vacuum oven at 165° C. under full vacuum for 40 minutes (2400 s) to remove the solvent. The B-staged material was then pressed at 205° C. for 16 hours (57,600 s) under 1000 psi (6895 kPa) pressure to give a composite with resin content of 39 weight percent loading. This composite had a Tg of 190° C.

EXAMPLE 4

Example of Polyindacenylpyridine/Bismaleimide Copolymer as a Neat Resin Molding The copolymer of polyindacenylpyridine/bismaleimide made in Preparation VI was molded at 185° C. under 2000 psi pressure for 10 hours (36,000 s) and then post cured for 30 minutes (1800 s) at 195° C. The cured material had a char yield in $N_2$ of 62% at 950° C., which is indicative of high thermal stability. This casting had a Tg of 268° C.

EXAMPLE 5

Example of Polyindanylpyridine/Bismaleimide Copolymer as a Neat Resin Molding The copolymer of polyindanylpyridine/bismaleimide made in Preparation III was molded at 205° C. under 2000 psi for 2 hours (7200 s) and then 6 hours (21,600 s) at 215° C. Finally, the temperature was raised to 220° C. for 6 hours (21,600 s). The cured material had a char yield in $N_2$ of 55% at 950° C., which is indicative of high thermal stability.

EXAMPLE 6

Example of Polyindacenylpyridine/Bismaleimide Copolymer as a Composite

The prepreg mat formed in Preparation VIII was B-staged in a vacuum oven at 170° C. under full vacuum for 40 minutes (2400 s) to remove the solvent. The B-staged material was then pressed at 200° C. for 8 hours (28,800 s) under 1000 psi (6895 kPa) pressure to give a composite with resin content of 33 weight percent loading. This composite had a Tg of 210° C.

EXAMPLE 7

Example of Polyindanylpyridine/Bismaleimide Copolymer as a Composite

The prepreg mat formed in Preparation VII was B-staged in a vacuum oven at 170° C. under full vacuum for 20 minutes (1200 s) to remove the solvent. The B-staged material was then pressed at 180° C. for 1 hour (3600 s) and 190° C. for 5 hours (18,000 s) under 1000 psi (6895 kPa) pressure to give a composite with resin content of 44 weight percent loading. This composite had a Tg of 222° C.

We claim:

1. A moldable, thermosettable polymer or prepolymer having a softening point below 300° C. which is prepared by reacting (A) a heterocyclic material containing at least one aromatic ring and one nitrogen atom therein or mixture of any two or more of such materials having at least one reactive substituent group having at least one reactive hydrogen atom attached to a carbon atom attached to the heterocyclic ring with the proviso that at least one of such heterocyclic materials has at least two reactive substituent groups having at least one reactive hydrogen atom attached to a carbon atom attached to the ring; with (B) at least one cycloaliphatic or aromatic carboxylic acid monoanhydride or dianhydride; wherein the reactants are employed in quantities which provide a mole ratio of (A) to (B) of from about 0.25:1 to about 4:1.

2. A thermosettable polymer or prepolymer of claim 1 wherein said reactive substituent groups are methyl groups and the reactants are employed in a mole ratio of (A) to (B) of from about 0.8:1 to about 1.5:1.

3. A thermosettable polymer or prepolymer of claim 2 wherein in component (A) the heterocyclic moiety is pyridine moiety and component (B) is represented by the formula

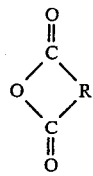

wherein R is a divalent cycloaliphatic or aromatic group.

4. A thermosettable polymer or prepolymer of claim 3 wherein component (A) is 2,4,6-trimethylpyridine and component (B) is phthalic anhydride.

5. A thermosettable polymer or prepolymer of claim 2 wherein in component (A) the heterocyclic moiety is a pyridine moiety and component (B) is represented by the formula

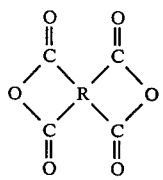

wherein R is a tetravalent cycloaliphatic or aromatic group.

6. A thermosettable polymer or prepolymer of claim 5 wherein component (A) is 2,4,6-trimethylpyridine and component (B) is pyromellitic dianhydride.

7. A thermosettable polymer or prepolymer prepared by reacting (A) a heterocyclic material containing at least one aromatic ring and one nitrogen atom therein or mixture of any two or more of such materials having at least one reactive substituent group having at least one reactive hydrogen atom attached to a carbon atom attached to the ring with the proviso that at least one of such heterocyclic materials has at least two reactive substituent groups having at least one reactive hydrogen atom attached to a carbon atom attached to the ring; (B) at least one dicarboxylic acid monoanhydride; (C) at least one tetracarboxylic acid dianhydride; wherein the reactants are employed in quantities which provide a mole ratio of (A) to (B) to (C) of from about 0.25:1:0.1 to about 4:1:4.

8. A thermosettable polymer or prepolymer of claim 7 wherein said reactive substituent groups are methyl groups and the reactants are employed in a mole ratio of (A) to (B) to (C) of from about 0.8:1:0.5 to about 3:1:2.

9. A thermosettable polymer or prepolymer of claim 8 wherein in component (A) the heterocyclic moiety is a pyridine moiety, component (B) is represented by the formula

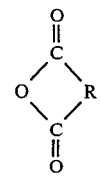

wherein R is a divalent cycloaliphatic or aromatic group and component (C) is represented by the formula

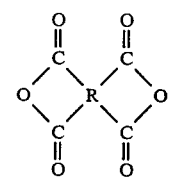

wherein R is a tetravalent cycloaliphatic or aromatic group.

10. A thermosettable polymer or prepolymer of claim 9 wherein component (A) is 2,4,6-trimethylpyridine and component (B) is phthalic anhydride and component (C) is pyromellitic dianhydride.

11. A process for preparing a thermosettable polymer or prepolymer having a softening temperature less than about 300° C. which comprises
(I) reacting in the absence of a catalyst or a dehydration agent a composition comprising
   (A) a heterocyclic material containing at least one aromatic ring and one nitrogen atom therein or mixture of any two or more of such materials having at least one reactive substituent group having at least one reactive hydrogen atom attached to a carbon atom attached to the ring with the proviso that at least one of such heterocyclic materials has at least two reactive substituent groups having a reactive hydrogen atom attached to a carbon atom attached to the ring; with
   (B) at least one cycloaliphatic or aromatic carboxylic acid monoanhydride or dianhydride;
   wherein components (A) and (B) are employed in quantities which provide a mole ratio of (A) to (B) of from about 0.25:1 to about 4:1;
(II) stopping the reaction to prevent the formation of high molecular weight polymer; and
(III) subjecting the polymer to sublimation, distillation or solvent extraction to remove unreacted reactants.

12. A process of claim 11 wherein said reactive substituent groups are methyl groups and the reactants are employed in a mole ratio of (A) to (B) of from about 0.8:1 to about 1.5:1.

13. A process of claim 12 wherein in component (A) the heterocyclic moiety is a pyridine moiety and component (B) is represented by the formula

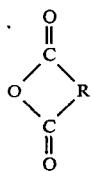

wherein R is a divalent cycloaliphatic or aromatic group.

14. A process of claim 13 wherein component (A) is 2,4,6,-trimethylpyridine and component (B) is phthalic anhydride.

15. A process of claim 12 wherein in component (A) the heterocyclic moiety is a pyridine moiety and component (B) is represented by the formula

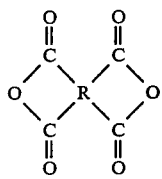

wherein R is a tetravalent cycloaliphatic or aromatic group.

16. A process of claim 15 wherein component (A) is 2,4,6-trimethylpyridine and component (B) is pyromellitic dianhydride.

17. A process for preparing a thermosettable polymer having a softening temperature less than about 300° C. which comprises (I) reacting in the absence of a catalyst or a dehydration agent a composition comprising (A) a heterocyclic material containing at least one aromatic ring and 1 nitrogen atom therein or mixture of any two or more of such materials having at least one reactive substituent group having at least one reactive hydrogen atom attached to a carbon atom attached to the ring with the proviso that at least one of such heterocyclic materials has at least two reactive substituent groups having at least one reactive hydrogen atom attached to a carbon atom attached to the ring;

(B) at least one dicarboxylic acid monoanhydride;

(C) at least one tetracarboxylic acid dianhydride; wherein the reactants are employed in quantities which provide a mole ratio of (A) to (B) to (C) of from about 0.25:1:0.1 to about 4:1:4;

(II) stopping the reaction to prevent the formation of high molecular weight polymer; and (III) subjecting the polymer to sublimation, distillation or solvent extraction to remove unreacted reactants and solvent if employed.

18. A process of claim 17 wherein said reactive substituent groups are methyl groups and the reactants are employed in a mole ratio of (A) to (B) to (C) of from about 0.8:1:0.5 to about 3:1:2.

19. A process of claim 18 wherein in component (A) the heterocyclic moiety is a pyridine moiety, component (B) is represented by the formula

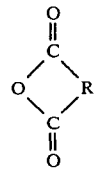

wherein R is a divalent cycloaliphatic or aromatic group and component (C) is represented by the formula

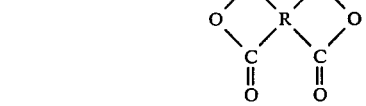

wherein R is a tetravalent cycloaliphatic or aromatic group.

20. A process of claim 19 wherein component (A) is 2,4,6-trimethylpyridine and component (B) is phthalic anhydride and component (C) is pyromellitic dianhydride.

21. A thermoset product resulting from subjecting a composition comprising a prepolymer or polymer of claim 1, 2, 3, 4, 5, 6, 7, 8, 9 or 10 to conditions sufficient to effect curing to a thermoset condition.

22. A thermoset product of claim 21 wherein said curing is effected by compression molding at a temperature of from about 150° to about 350° C. and a pressure up to about 100,000 psig.

23. A thermoset product of claim 21 wherein said composition contains a reinforcing material.

24. A thermoset product of claim 23 wherein said reinforcing material is woven, mat or random fibers of natural or synthetic materials.

25. A thermoset product of claim 24 wherein said reinforcing material is carbon, graphite, glass or aramid.

26. A thermoset product of claim 22 wherein said composition contains a reinforcing material.

27. A thermoset product of claim 26 wherein said reinforcing material is woven, mat or random fibers of natural or synthetic materials.

28. A thermoset product of claim 27 wherein said reinforcing material is carbon, graphite, glass or aramid.

29. A thermoset product resulting from subjecting a composition comprising a prepolymer or polymer prepared by a process of claims 11, 12, 13, 14, 15, 16, 17, 18, 19 or 20 to conditions sufficient to effect curing to a thermoset condition.

30. A thermoset product of claim 29 wherein said curing is effected by compression molding at a temperature of from about 150° to about 350° C. and a pressure up to about 100,000 psig.

31. A thermoset product of claim 30 wherein said composition contains a reinforcing material.

32. A thermoset product of claim 31 wherein said reinforcing material is woven, mat or random fibers of natural or synthetic materials.

33. A thermoset product of claim 32 wherein said reinforcing material is carbon, graphite, glass or aramid.

* * * * *